Patented May 24, 1938

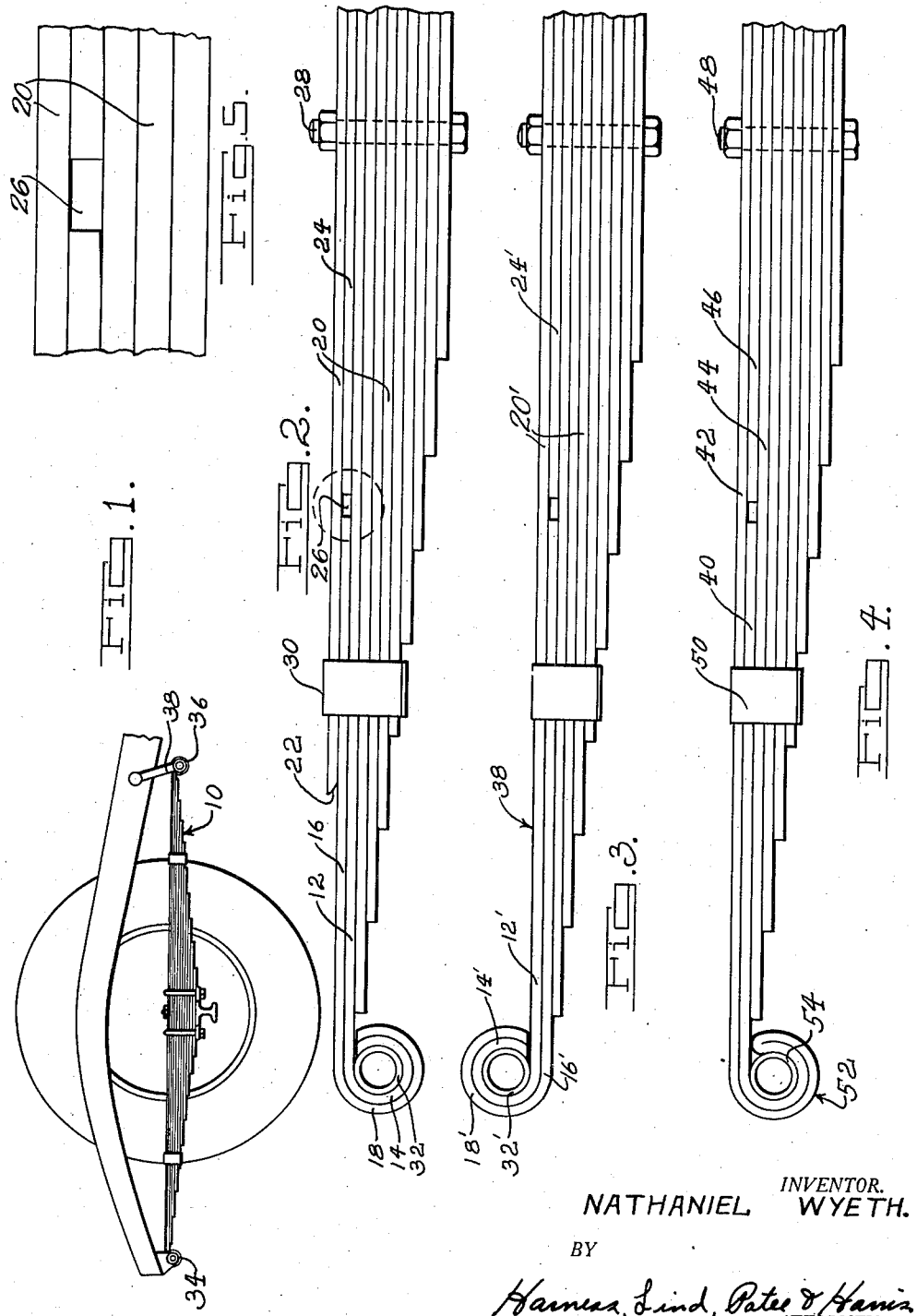
May 24, 1938.     N. WYETH     2,118,534
LEAF SPRING
Filed June 27, 1935
INVENTOR.
NATHANIEL WYETH.
BY
ATTORNEY.

2,118,534

UNITED STATES PATENT OFFICE 2,118,534

LEAF SPRING

Nathaniel Wyeth, Detroit, Mich., assignor to Chrysler Corporation, Highland Park, Mich., a corporation of Delaware Application June 27, 1935, Serial No. 28,664

4 Claims. (Cl. 267—47)

This invention relates to improved leaf springs.

More particularly the invention pertains to springs of this character for supporting the sprung portion of a vehicle upon the unsprung portion thereof.

Conventional leaf springs usually comprise a plurality of superimposed and nested supporting leaves disposed adjacent a main leaf member having eyes at its opposite end portions by which it is pivoted and/or shackled to parts of the structure with which it is associated. The parts of the pivots or shackles are generally journalled in bushings fitted within the eyes of the main leaf and held against turning by the prehensile action thereof. The thickness of the main leaf, which mainly influences the flexure properties of the spring, particularly within initial limits of deflection thereof, must be sufficient to facilitate holding of the bushings against turning in their respective eyes, unwrapping of the latter and buckling of the main leaf when the spring is subjected to normal load. The thickness of the main leaf must also be predetermined to sustain the maximum permissible stress to which the spring is subjected.

Frequently the minimum permissible thickness of the main leaf required to provide the foregoing and other essential properties will not afford the flexure characteristics required in a particular installation.

One of the main objects of the invention is to provide a spring which is freely flexible with respect to applied load and which has all of the foregoing and other essential properties of a leaf spring.

Another object of the invention is to provide a spring of this character which is more flexible than conventional leaf springs of equivalent load sustaining capacity and having main leaves of minimum permissible cross sectional dimensions.

A still further object of the invention is to provide a composite main leaf unit in a leaf spring of this character which has a flexure characteristic determining, long leaf section extending from end to end of the spring and having cross sectional dimensions less than those required to afford the other essential properties of the main leaf of the spring, and which is provided with spaced end leaf sections, each having an eye substantially concentric with and in reinforcing relationship with respect to one of the eyes of the long leaf section.

An additional object of the invention is to provide reinforcing leaf sections in a composite main leaf unit which supply those required structural and other properties that are lacking in a freely flexible main leaf section of insufficient cross sectional dimension, without reducing the flexibility of the leaf spring to that of leaf springs having a single piece main leaf of equivalent load sustaining capacity.

A further object of the invention is to provide spaced end leaf sections in a composite main leaf which have adjacent end portions slidably confined between the long leaf section and the adjacent supporting leaf of the spring.

Another object of the invention is to provide a spacing member at the central portion of the spring between the long section of the main leaf assembly and the adjacent supporting leaf for providing sufficient clearance therebetween to accommodate relative free shifting of the inner end portions of the end sections during normal spring action.

Another object of the invention is to provide a composite main leaf unit of this character having eyes extending in respectively opposite directions from the sides of the long leaf section, the edge of the long leaf section being disposed within the eye of the associated end leaf unit at the pivotally attached end of the spring.

The above being among the objects of the present invention, the same consists in certain novel features of constructions and combinations of parts to be hereinafter described with reference to the accompanying drawing and then claimed having the above and other objects in view.

Illustrative embodiments of the invention are shown in the accompanying drawing, in which:

Fig. 1 is an elevational view showing a leaf spring, embodying the invention, interposed in weight supporting relation between the sprung portion of a vehicle and an unsprung portion thereof;

Fig. 2 is an enlarged, fragmentary elevational view of the leaf spring illustrated in Fig. 1.

Fig. 3 is a fragmentary, elevational view, similar to Fig. 2, but showing a composite main leaf unit embodying a further development of the invention.

Fig. 4 is a fragmentary, elevational view similar to Figs. 2 and 3, but showing a composite main leaf unit embodying another form of the invention.

Fig. 5 is an enlarged, fragmentary, vertical sectional view of the portion of the spring embraced within the dotted circle of Fig. 2 and illustrating the corresponding structure of Figs. 3 and 4.

In the form of the invention illustrated in Figs. 1 and 2, the leaf spring, generally designated by the numeral 10, includes a composite main leaf comprising a long leaf section 12 which extends from end to end of the leaf spring and which is provided at its longitudinal extremities with eyes 14. A pair of end leaf sections 16 are arranged adjacent the opposite end portions of the long leaf section 12 and provided with eyes 18 which are disposed substantially in concentric relation with respect to and externally of the eyes 14 of the long leaf section 12. The inner or adjacent end portions of the end leaf section 16 are slidably disposed between the intermediate portions of the long leaf section 12 and an adjacent supporting or reinforcing leaf 20. Any required number of superimposed and nested supporting or reinforcing leaves 20 may be employed depending upon the characteristics required of the resulting leaf spring. In the spring illustrated in Figs. 1 and 2, the end leaf sections 16 are disposed above the long leaf section 12 and the spring eyes are coiled downwardly so as to bring the eyes 14 of the long leaf section into an internal position with respect to the eyes 18 of the end leaf sections. One of the supporting leaves 20 is disposed above the end leaf sections 16 so as to confine the inner end portions thereof between the uppermost supporting leaf 20 and the long leaf section 12. This uppermost supporting or reinforcing leaf 20 serves as a rebound plate and it is preferably provided with rounded extremities 22. The shape and construction of the rebound plate and associated reinforcing leaves 20 may be predetermined to meet the requirements for which the spring is designed and if desired some of the supporting leaves may be omitted.

Although only slightly more than one-half of the length of a leaf spring is disclosed in the drawing, it is obvious that both ends of the spring illustrated in Figs. 1 and 2 are substantially identical. A spacing plate 24 is disposed between the long leaf section 12 and the uppermost supporting leaf 20 and located between the adjacent extremities of the end leaf sections 16. This spacing plate has a slightly greater thickness than the thickness of the adjacent end portions of the end leaf sections 16 and it provides sufficient clearance to accommodate relatively free sliding of the inner end portions of the end leaf sections 16 with respect to the adjacent parts of the leaf spring during normal flexure thereof, there being sufficient clearance, as illustrated at 26, between the adjacent ends of the spacing plate 24 and the extremities of the end leaf sections 16 to accommodate sliding of the latter. The reinforcing leaves 20, spacing plate 22 and long leaf section 12 are provided at their central portions with registering apertures through which a tie bolt 28 extends. The tie bolt serves to clamp the various leaves of the leaf spring in a predetermined assembled relationship and is assisted in this respect by spaced clips 30, one or more of which are located on each of the opposite end portions of the leaf spring.

When a leaf spring of this character is employed to support the sprung portion of a vehicle, a bushing 32 is preferably provided in each eye 14 of the long leaf section 12 and one bushing is journalled on a fixed pivot, as illustrated at 34 in Fig. 1, while the other end of the spring is pivotally connected to the vehicle chassis frame by a shackle 36. It is preferable to arrange the sections of the composite main leaf so that that end thereof which is attached to the fixed pivot of the spring mounting has an internal eye formed integral with the long leaf section, the corresponding eye of the associated short leaf section being externally located.

In the form of the invention illustrated in Fig. 3, the leaf spring, generally designated by the numeral 38 is similar to the leaf spring 10 shown in Figs. 1 and 2 but the eyes thereof project in an opposite direction from the main leaf. The left-hand eye shown in Fig. 2 projects upwardly with respect to the composite main leaf while the eye at the right end of the spring (not shown) may likewise project upwardly or downwardly as desired. In this structure, the long leaf section 12' is disposed at the top of the nested stack of superimposed supporting or reinforcing leaves 20' in order to bring the eye 14' thereof to the interior of the eye 18' of the associated end leaf section 16'. A bushing 32' is provided within the inner eye 14'. If the eye of the right end of the spring shown in Fig. 3 is disposed downwardly then that portion thereof formed by the right end of the long leaf section 12' will be disposed externally. In mounting a spring of this character, it is preferable to pivotally connect the end of the spring having an eye of a long leaf section located within an external eye formed on an end leaf section, to the chassis by a shackle.

The inner end portions of the end leaf sections 16' are slidably disposed between the long leaf section 12' of the composite main leaf and the next adjacent supporting leaf 20'. Sliding clearance is provided by a spacing plate 24' which has a slightly greater thickness than that of the adjacent end portions of the end leaf sections 16'. All of the leaves of the spring are clamped together by a tie bolt 28' which passes through registering apertures in the spring leaves.

In the form of the invention illustrated in Fig. 4, the structure is similar to that shown in Figs. 1 to 3, inclusive, but the composite main leaf is formed of an integral piece of spring metal having end portions folded inwardly and backwardly so as to provide a double thickness of spring metal throughout the eyes and throughout those portions of the main leaf which are unsupported by the reinforcing leaves and which therefore mainly predetermine the maximum permissible load carrying capacity thereof. The inwardly bent end portions of the composite main leaf, designated by the numeral 40, are disposed between the intermediate portion 42 of the main leaf and the next adjacent supporting leaf 44. Any desired number of nested, superimposed supporting leaves may be employed to provide the characteristics desired in the resulting spring. The inwardly folded end portions 40 terminate short of the central portion of the spring and clearance for sliding movement thereof relative to the supporting leaves 44 and intermediate section 42 of the main leaf is provided by a spacing plate 46 which is slightly thicker than the thickness of the adjacent end portions of the inwardly folded section 40. The various leaves of the spring are held together by a tie bolt 48 and associated clips 50. Mounted within each eye 52 formed by the superimposed sections of the main leaf is a bushing 54. The eyes 52 of the respectively opposite end of the main leaf shown in Fig. 4 may be disposed in either direction with respect to the longitudinal axis of the spring and one eye may be coiled downwardly while the other eye is coiled upwardly, if desired.

In the forms of the invention shown in Figs. 1 to 3, inclusive, the eyes of the long leaf section and the end leaf sections may be formed in any conventional manner, but it is preferable to bring these eyes to their final shape and dimension and to then assemble the various sections of the main leaf unit by bringing the internal eye of one leaf section into registration with the passage of the external eye of an associated section and then forcing the eyes together axially under pressure. The outer dimensions of the internal eyes are preferably slightly larger than the internal dimensions of the outer eye. In the form of the invention shown in Fig. 4, the superimposed layers of the integral spring metal member are preferably pressed firmly together and then coiled to a desired shape. The close fitting relationship between the eyes of the main leaf section and the end leaf sections affords that reinforcement that is required to prevent turning of the bushing with which spring eyes of this character are provided. The reinforcement afforded by the concentric eye structure also prevents unwrapping of the eye during normal spring action.

The cross sectional dimensions of the long leaf section are preferably so predetermined as to produce the desired flexure characteristics without necessarily maintaining sufficient cross sectional area to independently withstand the maximum strength to which the main leaf structure is normally subjected under load deflection. The end leaf sections are then relied upon to add those structural properties which are sacrificed in order to obtain the desired flexure characteristics. Inasmuch as the inner end portions of the end leaf sections of the composite leaf unit are free to slide relative to the long leaf section and associated reinforcing leaves, these end leaf sections do not impair the flexure characteristics to that extent which they would be modified by providing the required cross sectional dimensions in a single main leaf structure. In this manner leaf springs having greater flexibility than conventional leaf springs of equivalent load sustaining capacity may be economically constructed and as a result the vehicles in which such springs are employed have a softer spring action and more satisfactory ride characteristics. This is accomplished without in any way sacrificing strength, stability or load carrying capacity or shortening the life of the leaf spring structure.

Although but several specific embodiments of the invention are herein shown and described, it will be understood that various changes in the size, shape and arrangement of parts may be made without departing from the spirit of the invention, and it is not intended to limit its scope other than by the terms of the appended claims.

What I claim is:

1. In a leaf spring having a reinforcing spring leaf; a composite main leaf including a long leaf section having an eye at each of its longitudinal extremities, a pair of spaced end leaf sections having outer extremities fixed in reinforcing relation to and against longitudinal movement with respect to said eyes and having the major parts of their inner end portions in surface contact with said long leaf section and slidably disposed immediately between said long leaf section and said reinforcing spring leaf, and spacing means of greater thickness than the inner end portions of said end leaf sections located at the central portion of said leaf spring between said long leaf section and said reinforcing leaf for providing sliding clearance therebetween for the inner end portions of said end leaf sections.

2. In a leaf spring having a reinforcing spring leaf; a composite main leaf including a long leaf section having an eye at each of its longitudinal extremities, a pair of spaced end leaf sections having outer extremities fixed in reinforcing relation to and against longitudinal movement with respect to said eyes and having the major parts of their inner end portions in surface contact with said long leaf section and slidably disposed immediately between said long leaf section and said reinforcing spring leaf, spacing means of greater thickness than the inner end portions of said end leaf sections located at the central portion of said leaf spring between said long leaf section and said reinforcing leaf for providing sliding clearance therebetween for the inner end portions of said end leaf sections, and a tie bolt extending through registering apertures in said long leaf section, spacing means and said reinforcing leaf for holding the same in assembled relation.

3. A leaf spring including a reinforcing spring leaf, a main leaf section having an eye formed on each of its opposite extremities respectively, spaced end leaf sections having the major parts of their inner end portions in direct contact with said main leaf section and slidably disposed immediately between said main leaf section and said reinforcing leaf, each having an eye in substantially concentric reinforcing relationship with an eye of said main leaf section, and spacing means of greater thickness than the inner end portions of said end leaf sections located at the central portion of said leaf spring between said main leaf section and said reinforcing leaf for providing sliding clearance therebetween for the inner end portions of said end leaf sections.

4. In a leaf spring having a reinforcing spring leaf; a composite main leaf including a long leaf section having an eye at each of its longitudinal extremities, a pair of spaced end leaf sections having outer extremities fixed in reinforcing relation to and against longitudinal movement with respect to said eyes and having inner end portions in surface contact with said long leaf section and slidably disposed immediately between said long leaf section and said reinforcing spring leaf, and spacing means of greater thickness than the inner end portions of said end leaf sections located between said long leaf section and said reinforcing leaf and between the inner end portions of said end leaf sections for providing sliding freedom for the inner end portions of said end leaf sections.

NATHANIEL WYETH.